(12) United States Patent
Ohkuma

(10) Patent No.: US 11,034,248 B2
(45) Date of Patent: Jun. 15, 2021

(54) BATTERY CASE FIXING STRUCTURE

(71) Applicant: HONDA MOTOR CO., LTD., Tokyo (JP)

(72) Inventor: Kanae Ohkuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/527,031

(22) Filed: Jul. 31, 2019

(65) Prior Publication Data
US 2020/0070671 A1 Mar. 5, 2020

(30) Foreign Application Priority Data
Aug. 28, 2018 (JP) .............................. JP2018-158937

(51) Int. Cl.
| | |
|---|---|
| *B60L 50/60* | (2019.01) |
| *B60K 1/04* | (2019.01) |
| *B62D 25/20* | (2006.01) |
| *H01M 50/20* | (2021.01) |
| *B22D 17/00* | (2006.01) |
| *B60K 6/28* | (2007.10) |

(52) U.S. Cl.
CPC ............... *B60L 50/66* (2019.02); *B60K 1/04* (2013.01); *B62D 25/20* (2013.01); *H01M 50/20* (2021.01); *B22D 17/00* (2013.01); *B60K 6/28* (2013.01); *B60K 2001/0438* (2013.01); *B60Y 2200/91* (2013.01); *B60Y 2200/92* (2013.01); *H01M 2220/20* (2013.01)

(58) Field of Classification Search
CPC .. B60K 2001/0438; B60L 50/64; B60L 50/66
USPC ........................................................ 180/68.5
See application file for complete search history.

(56) References Cited

U.S. PATENT DOCUMENTS

| | | | | |
|---|---|---|---|---|
| 7,824,797 B2* | 11/2010 | Nishino | .................. | B60L 58/21 |
| | | | | 429/163 |
| 7,997,368 B2* | 8/2011 | Takasaki | ................. | B60R 16/04 |
| | | | | 180/68.5 |

(Continued)

FOREIGN PATENT DOCUMENTS

| | | |
|---|---|---|
| DE | 102011052515 | 2/2013 |
| DE | 102013204339 | 9/2013 |

(Continued)

OTHER PUBLICATIONS

Decision of a Patent Grant issued by the Japan Patent Office for corresponding JP Application No. 2018-158937, dated Mar. 4, 2020.

(Continued)

*Primary Examiner* — Jeffrey J Restifo
(74) *Attorney, Agent, or Firm* — Mori & Ward, LLP

(57) ABSTRACT

In a battery case fixing structure, a case side wall, facing outward in a vehicle width direction, of a battery case includes at least two fixing portions that project outward in the vehicle width direction and are fixed to a vehicle body, and a linking wall that is formed as a planar shape opposing the case side wall and links the at least two fixing portions in a fore-and-aft direction, the fixing portions and the linking wall being formed integrally with the battery case. Accordingly, it is possible to enhance the side collision resistance performance by increasing the strength of a battery case of an electric vehicle.

7 Claims, 7 Drawing Sheets

(56) References Cited

U.S. PATENT DOCUMENTS

| | | | |
|---|---|---|---|
| 8,835,033 B2* | 9/2014 | Choi | B60L 3/0015 |
| | | | 429/100 |
| 8,980,458 B2* | 3/2015 | Honjo | H01M 2/1083 |
| | | | 429/100 |
| 9,045,030 B2* | 6/2015 | Rawlinson | B62D 25/20 |
| 9,056,631 B2* | 6/2015 | Nakamori | H01M 2/1083 |
| 9,077,019 B2* | 7/2015 | Kosaki | H01G 9/155 |
| 9,160,042 B2* | 10/2015 | Fujii | B60K 1/04 |
| 9,216,638 B2* | 12/2015 | Katayama | B60L 1/003 |
| 9,227,582 B2* | 1/2016 | Katayama | B60R 16/04 |
| 9,444,082 B2* | 9/2016 | Tsujimura | B60L 58/21 |
| 9,566,859 B2* | 2/2017 | Hatta | B60L 1/02 |
| 9,722,223 B1* | 8/2017 | Maguire | H01M 2/1083 |
| 9,758,030 B2* | 9/2017 | Newman | H01M 2/1077 |
| 9,884,545 B1* | 2/2018 | Addanki | B60K 6/445 |
| 9,919,591 B2* | 3/2018 | Mizoguchi | B60L 58/26 |
| 9,937,781 B1* | 4/2018 | Bryer | B60K 1/04 |
| 9,987,912 B2* | 6/2018 | Shinoda | B62D 21/155 |
| 10,017,037 B2* | 7/2018 | Newman | B62D 25/20 |
| 10,062,876 B2* | 8/2018 | Wuensche | H01M 2/1005 |
| 10,336,211 B2* | 7/2019 | Kobayashi | H01M 2/1072 |
| 10,371,181 B1* | 8/2019 | Reibling | F16B 5/0635 |
| 10,381,621 B2* | 8/2019 | Maguire | H01M 2/1094 |
| 10,431,791 B2* | 10/2019 | Lomax | H01M 2/1077 |
| 10,464,406 B2* | 11/2019 | Kawabe | B62D 25/2036 |
| 10,476,117 B2* | 11/2019 | Ito | H01M 2/1077 |
| 10,486,514 B2* | 11/2019 | Takayanagi | B60L 50/72 |
| 10,486,516 B2* | 11/2019 | Yamanaka | B62D 21/02 |
| 10,486,746 B2* | 11/2019 | Kawabe | B60L 50/66 |
| 10,532,777 B2* | 1/2020 | Lee | B62D 25/2027 |
| 10,547,039 B2* | 1/2020 | Toyota | H01M 2/1083 |
| 10,549,619 B2* | 2/2020 | Nakayama | H01M 2/0237 |
| 10,583,746 B2* | 3/2020 | Ogaki | B60L 50/66 |
| 10,597,084 B2* | 3/2020 | Ayukawa | B60K 1/04 |
| 10,603,998 B2* | 3/2020 | Toyota | B60K 1/04 |
| 10,603,999 B2* | 3/2020 | Fukui | B60K 1/04 |
| 10,611,234 B1* | 4/2020 | Berels | H01M 10/6567 |
| 10,647,213 B2* | 5/2020 | Otoguro | B62D 21/03 |
| 10,661,840 B1* | 5/2020 | Saje | B60K 1/04 |
| 10,668,957 B2* | 6/2020 | Choi | B62D 25/2036 |
| 2011/0143179 A1 | 6/2011 | Nakamori | |
| 2011/0297467 A1 | 12/2011 | Iwasa et al. | |
| 2013/0244068 A1 | 9/2013 | Kuroda | |
| 2015/0174996 A1 | 6/2015 | Ikeda et al. | |
| 2018/0236863 A1 | 8/2018 | Kawabe et al. | |
| 2019/0237723 A1 | 8/2019 | Niwa et al. | |
| 2020/0031399 A1 | 1/2020 | Matsuda et al. | |

FOREIGN PATENT DOCUMENTS

| | | |
|---|---|---|
| DE | 102016203553 | 9/2017 |
| DE | 102017209729 | 12/2018 |
| DE | 112017005190 T5 | 7/2019 |
| EP | 2332761 | 6/2011 |
| JP | H07-117490 | 5/1995 |
| JP | H10-129277 | 5/1998 |
| JP | 2000-085375 | 3/2000 |
| JP | 2011-124101 | 6/2011 |
| JP | 2015-123797 | 7/2015 |
| JP | 2018-131136 | 8/2018 |
| JP | 2019-021473 | 2/2019 |
| WO | WO 2010/098271 | 9/2010 |
| WO | WO 2018/163815 | 9/2018 |

OTHER PUBLICATIONS

German Search Report for corresponding DE Application No. 102019211438.5, dated Feb. 17, 2020.

German Office Action for corresponding DE Application No. 102019211438.5, dated Feb. 20, 2020.

* cited by examiner

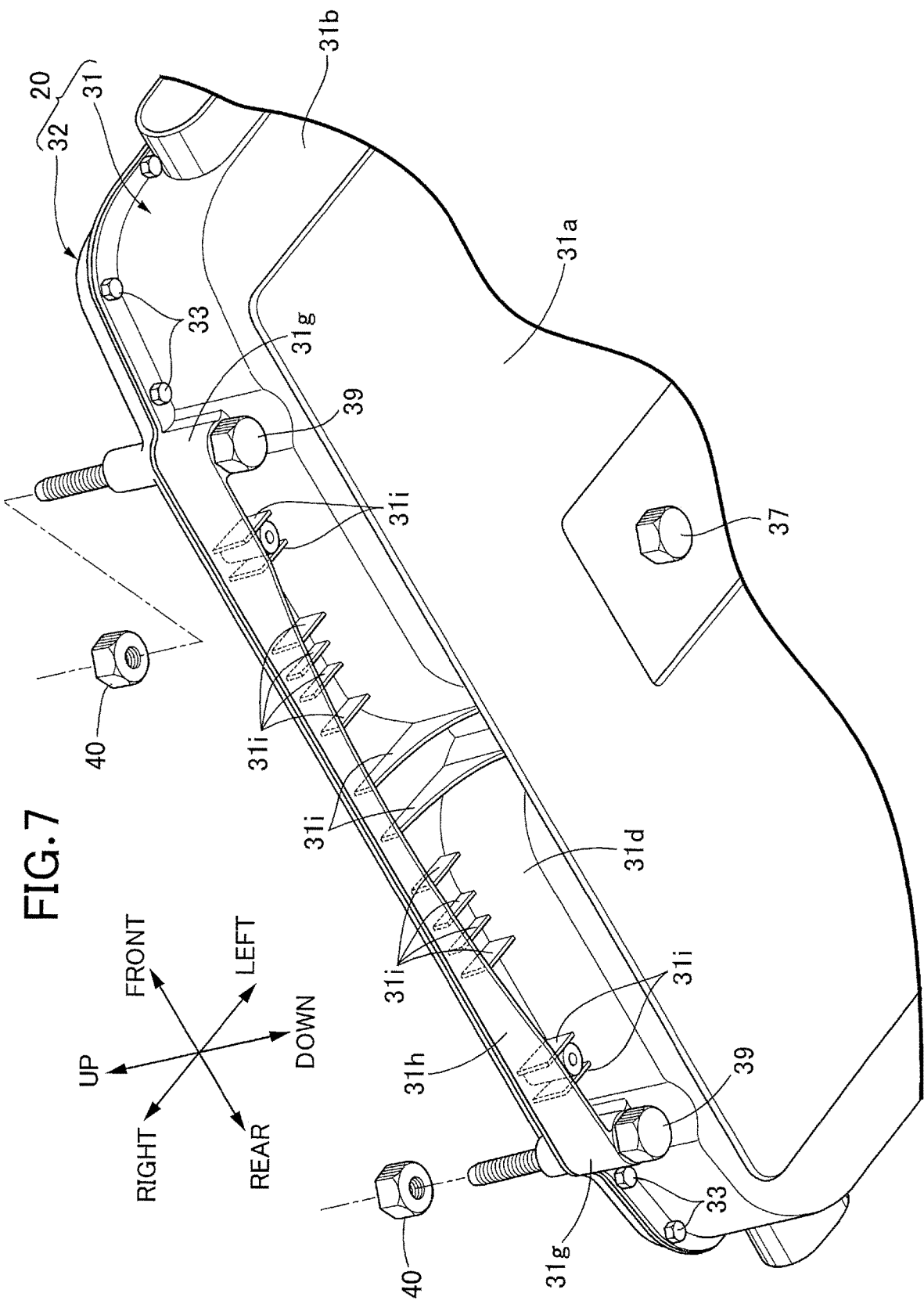

BATTERY CASE FIXING STRUCTURE

BACKGROUND OF THE INVENTION

Field of the Invention

The present invention relates to a battery case fixing structure via which a battery case, made by metal die-casting, housing a battery for driving an electric vehicle is fixed to a lower part of a vehicle body.

Description of the Related Art

Japanese Patent Application Laid-open No. 2000-85375 has made known an arrangement in which a shelf part extending in the horizontal direction, a vertical flange extending in the vertical direction, and a horizontal flange extending in the horizontal direction are made to protrude from an opening at the upper end of a side wall of a case, made by aluminum die-casting, housing a battery for driving an electric vehicle, so as to form a crank-shaped section, and the horizontal flange is fastened to a floor skeleton member by a bolt.

In the above conventional arrangement, when the electric vehicle is involved in a side collision and a collision load is inputted into the battery case, the portion having a crank-shaped section and protruding from the upper end opening of the side wall of the battery case cannot absorb the collision energy effectively, and there is a possibility that the drive battery housed in its interior will not be fully protected.

SUMMARY OF THE INVENTION

The present invention has been accomplished in light of the above circumstances, and it is an object thereof to enhance the side collision resistance performance by increasing the strength of a battery case of an electric vehicle.

In order to achieve the object, according to a first aspect of the present invention, there is provided a battery case fixing structure via which a battery case, made by metal die-casting, housing a battery for driving an electric vehicle is fixed to a lower part of a vehicle body, wherein a case side wall, facing outward in a vehicle width direction, of the battery case comprises at least two fixing portions that project outward in the vehicle width direction and are fixed to the vehicle body, and a linking wall that is formed as a planar shape opposing the case side wall and links said at least two fixing portions in a fore-and-aft direction, the fixing portions and the linking wall being formed integrally with the battery case.

In accordance with the first aspect, the battery case, made by metal die-casting, housing the battery for driving an electric vehicle is fixed to the lower part of the vehicle body. Since the case side wall, facing outward in the vehicle width direction, of the battery case includes said at least two fixing portions, which project outward in the vehicle width direction and are fixed to the vehicle body, and the linking wall, which is formed as a planar shape opposing the case side wall and links said at least two fixing portions in the fore-and-aft direction, and the fixing portion and the linking wall are fainted integrally with the battery case, when the collision load of a side collision is inputted into the battery case, due to collapsing of the space surrounded by the two fixing portions, the linking wall, and the case side wall, the collision energy can be absorbed effectively. Moreover, since the fixing portion and the linking wall are formed integrally with the battery case made by metal die-casting, not only is it possible to reduce the number of components, but also the stiffness of the battery case can be enhanced by the fixing portion and the linking wall.

According to a second aspect of the present invention, in addition to the first aspect, the battery case comprises, between the two fixing portions, a rib that links the case side wall and the linking wall in the vehicle width direction.

In accordance with the second aspect, since the battery case includes, between the two fixing portions, the rib linking the case side wall and the linking wall in the vehicle width direction, the side collision resistance performance can be further enhanced by reinforcing the fixing portion and the linking wall with the rib.

According to a third aspect of the present invention, in addition to the first or second aspect, the fixing portion is fixed to a floor frame extending in the fore-and-aft direction, and an outer end in the vehicle width direction of the fixing portion is positioned further inside in the vehicle width direction than the outer end in the vehicle width direction of the floor frame.

In accordance with the third aspect, since the fixing portion is fixed to the floor frame extending in the fore-and-aft direction, and the outer end in the vehicle width direction of the fixing portion is positioned further inside in the vehicle width direction than the outer end in the vehicle width direction of the floor frame, the collision load of a side collision is preferentially supported by the floor frame, and a collision load that could not be received is received by the battery case, thus minimizing damage to the battery case.

Note that a case main body 31 of an embodiment corresponds to the battery case of the present invention, second fixing portions 31g of the embodiment correspond to the fixing portions of the present invention, and battery modules 34 of the embodiment correspond to the battery for driving of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 7 is a view in the direction of arrow 7 in FIG. 6.

DESCRIPTION OF THE PREFERRED EMBODIMENT

An embodiment of the present invention is explained below by reference to FIG. 1 to FIG. 7. In the following description reference numbers corresponding to components of exemplary embodiment are included only for ease of understanding, but the applicant's claims are not limited to the exemplary embodiment or to specific components of the exemplary embodiment. In the present specification, the fore-and-aft direction, the left-and-right direction (vehicle width direction), and the up-and-down direction are defined with reference to an occupant seated on a driving seat.

Figure 1:
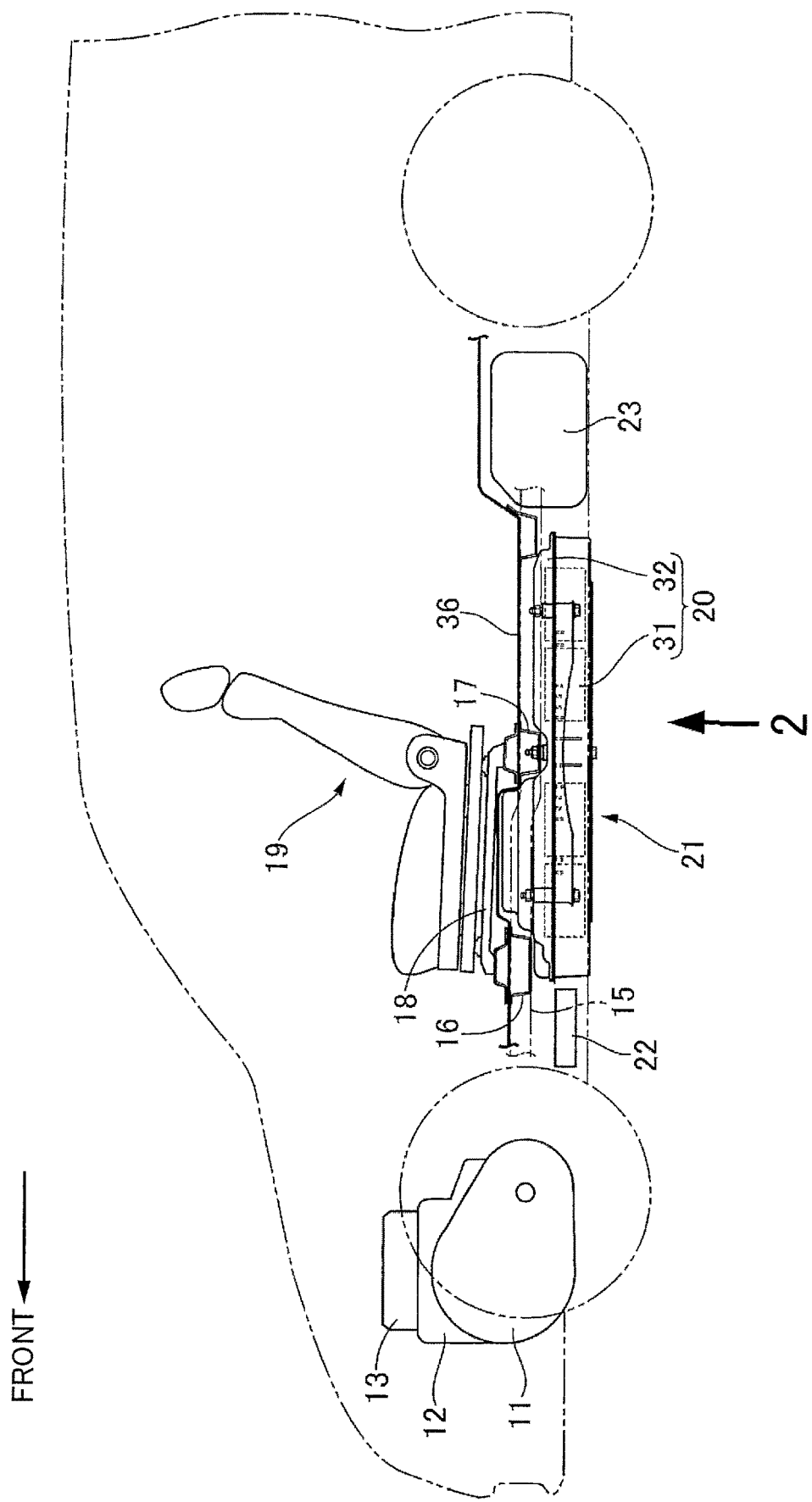
FIG. 1 is a side view of a vehicle body of a plug-in hybrid vehicle.
Figure 2:
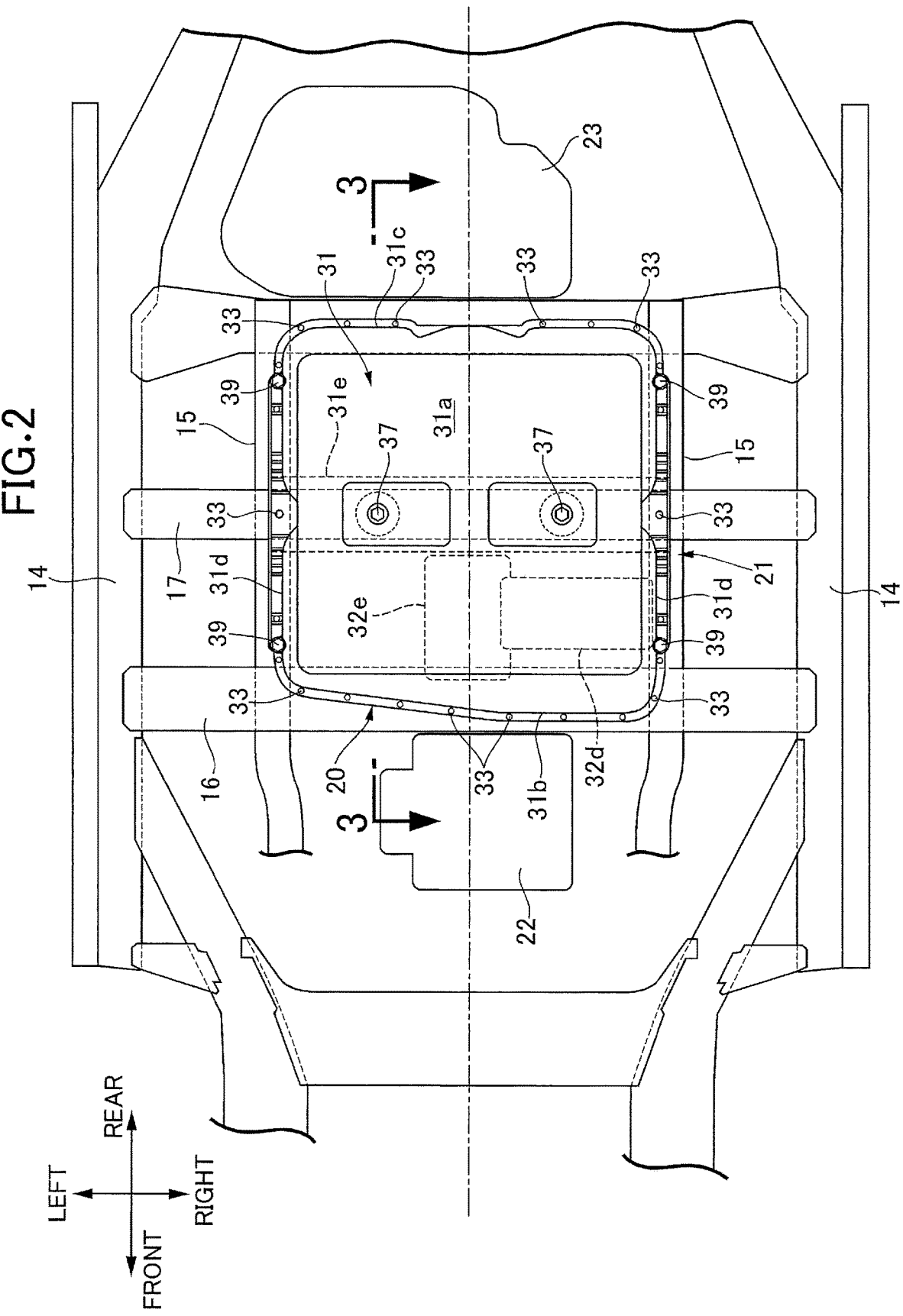
FIG. 2 is a view in the direction of arrow 2 in FIG. 1.
Figure 4:
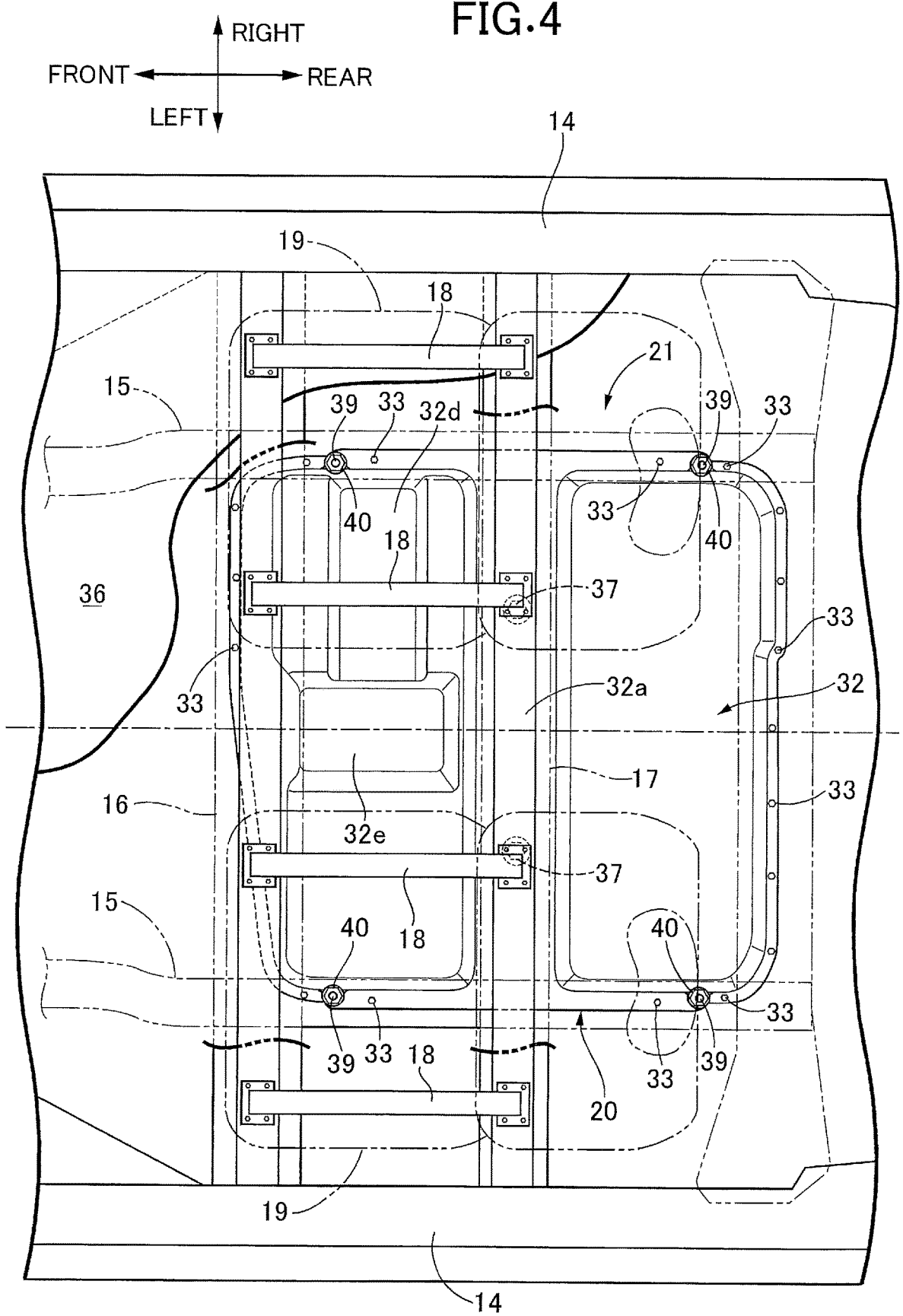
FIG. 4 is a view from arrowed line 4-4 in FIG. 3.
Figure 5:
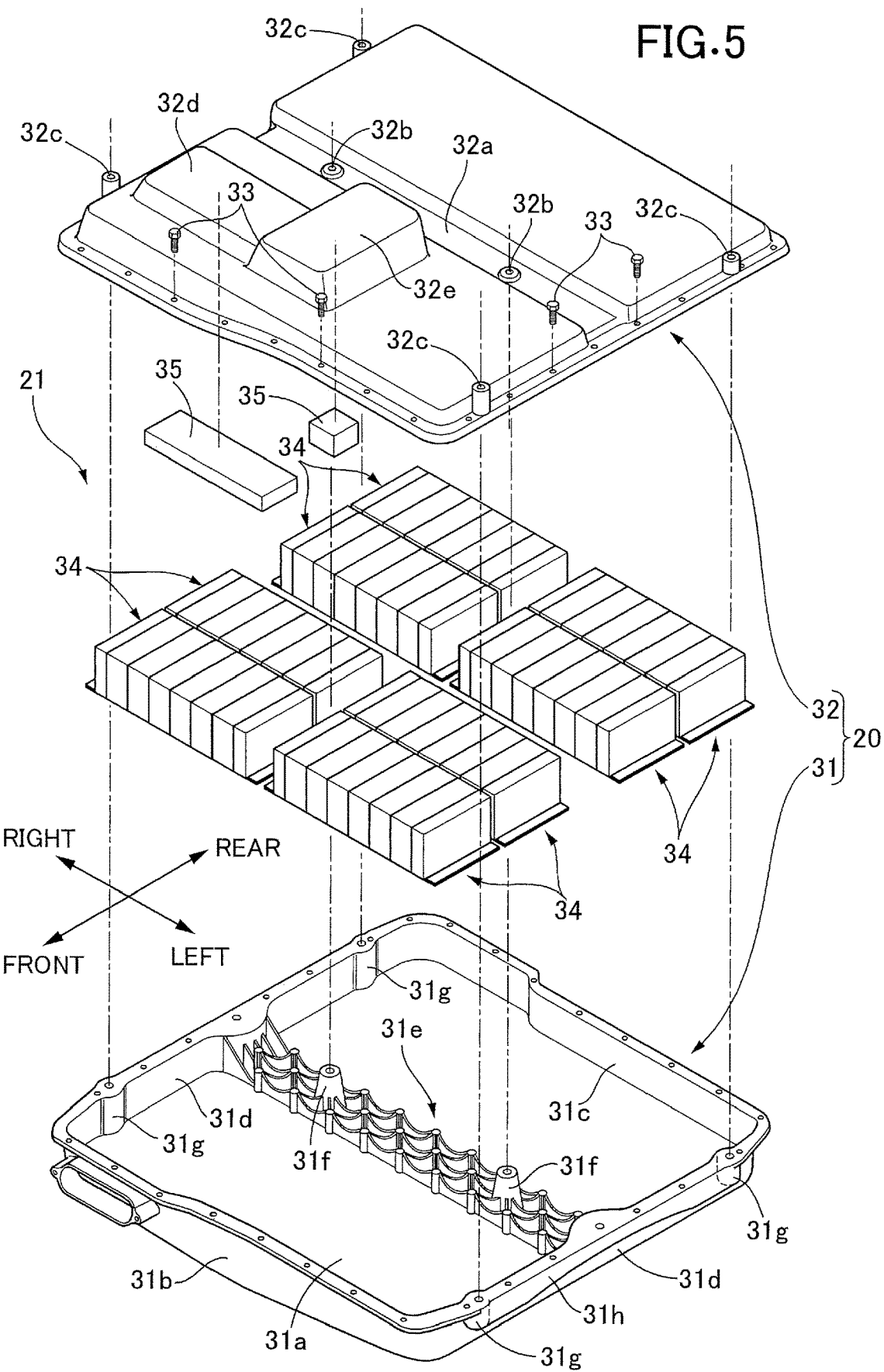
FIG. 5 is an exploded perspective view of a battery pack.
Figure 6:
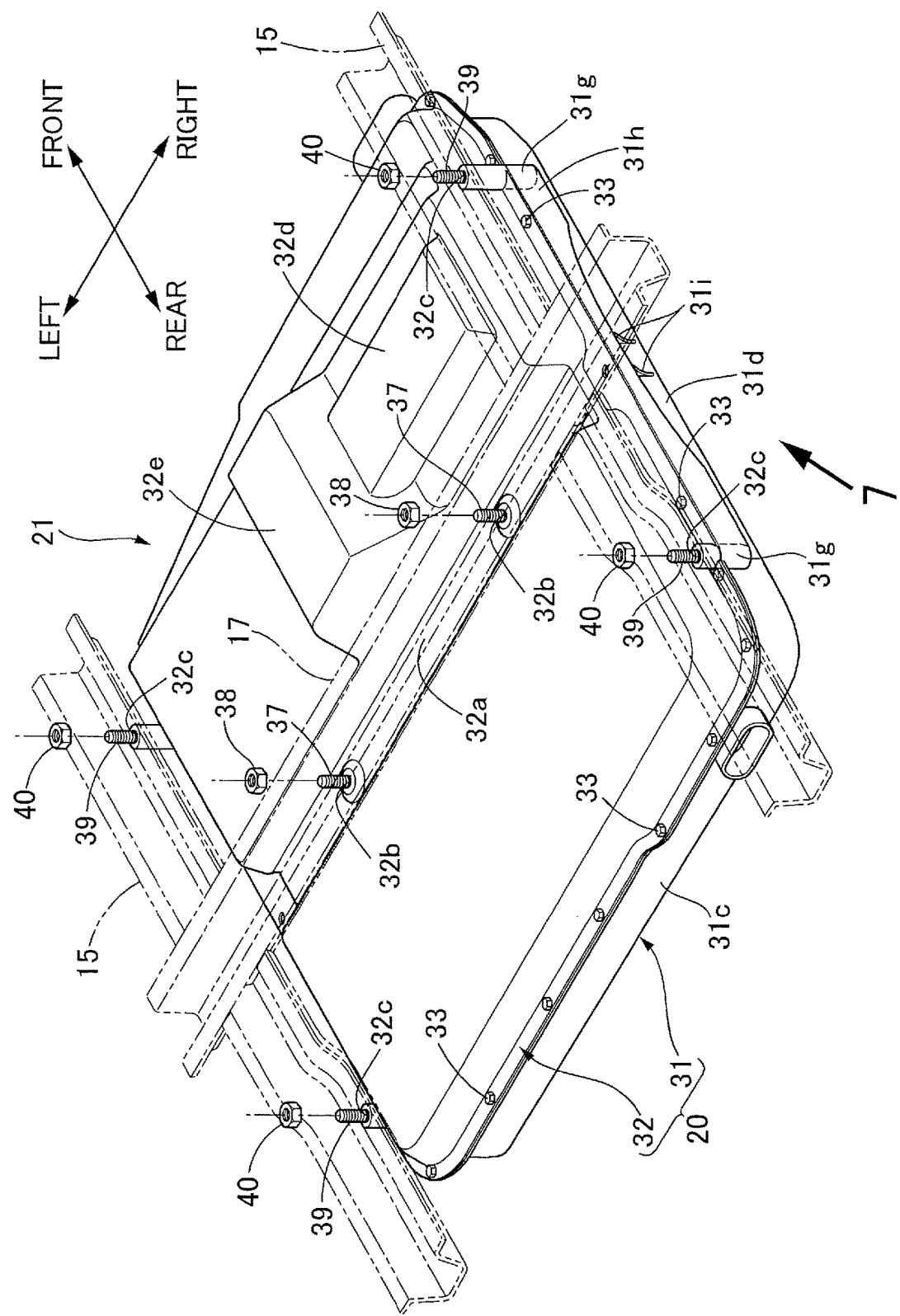
FIG. 6 is a perspective view showing a state in which the battery pack is mounted.

As shown in FIG. 1, FIG. 2, and FIG. 4, mounted on a front part of a vehicle body of a front wheel drive plug-in hybrid vehicle are an electric motor 11 for driving a front wheel, an engine 12 for driving a generator charging a battery, and a power drive unit 13 equipped with an inverter for controlling the driving of the electric motor 11.

A pair of left and right side sills 14 extending in the fore-and-aft direction are disposed on left and right sides of a middle part of the vehicle body, a pair of left and right floor frames 15 extending in the fore-and-aft direction are disposed inside in the vehicle width direction of the left and right side sills 14, front parts of the left and right side sills 14 and the left and right floor frames 15 are connected by a first floor cross member 16 extending in the vehicle width direction, and intermediate parts in the fore-and-aft direction of the left and right side sills 14 and the left and right floor frames 15 are connected by a second floor cross member 17 extending in the vehicle width direction. The first floor cross member 16 and the second floor cross member 17 are connected by a plurality of seat rails 18 extending in the fore-and-aft direction, and a front seat 19 is supported on the seat rails 18.

A battery pack 21 housing, within a battery case 20, a battery for driving the electric motor 11 is supported on lower faces of the left and right floor frames 15 and the second floor cross member 17. Disposed on the front side of the battery pack 21 is a charger 22 (or a non-contact type charging pad) that is connected to an external power supply via a charging cable and charges the battery, and disposed on the rear side of the battery pack 21 is a fuel tank 23 storing fuel for driving the engine 12.

As shown in FIG. 2 to FIG. 7, the battery case 20 is formed by joining in the vertical direction a case main body 31 made by metal (aluminum) die-casting and opening upward and a cover 32 made by metal (aluminum) die-casting and opening downward via outer peripheral parts thereof by means of a plurality of bolts 33. Eight battery modules 34 are mounted on a bottom part of the case main body 31, and an electrical component 35 such as a battery control device, a junction board, or a cell voltage sensor is disposed above the battery modules 34.

The case main body 31 has a shallow container shape and includes a substantially flat case bottom wall 31a, a case front wall 31b, a case rear wall 31c, and left and right case side walls 31d rising from the outer periphery of the case bottom wall 31a, and a cross member 31e connecting the left and right case side walls 31d in the vehicle width direction. The cross member 31e of the present embodiment is an assembly of a large number of ribs rising from the case bottom wall 31a (see FIG. 5), but any structure may be employed. A pair of left and right cylindrical first fixing portions 31f are formed on the cross member 31e of the case main body 31, and a pair of front and rear cylindrical second fixing portions 31g are formed on outer faces in the vehicle width direction of the left and right case side wall 31d. The pair of front and rear second fixing portions 31g are connected by a linking wall 31h having an L-shaped section and extending in parallel with the case side wall 31d. As a result, a space opening downward is formed so as to be surrounded by the case side wall 31d, the pair of second fixing portions 31g, and the linking wall 31h, and a plurality of ribs 31i connecting the case side wall 31d and the linking wall 31h are formed within this space.

A downwardly recessed groove-shaped recess portion 32a is form at a position, corresponding to the cross member 31e of the case main body 31, of the cover 32 of the battery case 20, a pair of bolt holes 32b overlapping the pair of first fixing portions 31f of the case main body 31 are fainted in the recess portion 32a, and a pair of bolt holes 32c overlapping the pair of second fixing portions 31g of the case main body 31 are formed in the left and right outer walls in the vehicle width direction of the cover 32. Bulge portions 32d and 32e housing the electrical component 35 are projectingly provided on a front part of the cover 32 so as to face upward.

Figure 3:
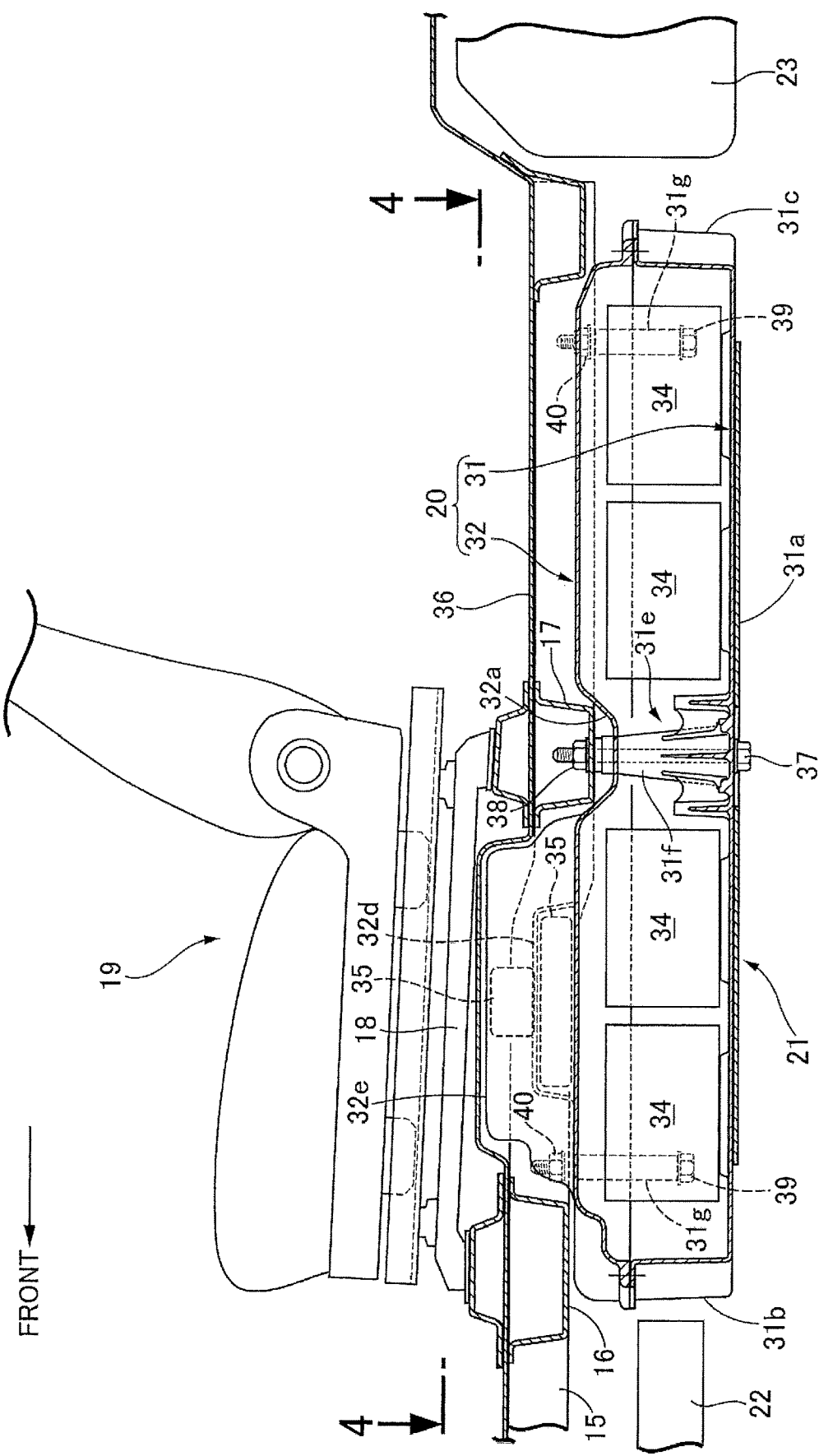
FIG. 3 is sectional view along line 3-3 in FIG. 2.

The second floor cross member 17 fixed to a lower face of a vehicle body floor 36 overlaps the cross member 31e of the case main body 31 and the recess portion 32a of the cover 32 when viewed in the up-down direction (see FIG. 3).

The battery case 20 thus arranged is fixed to the lower face of the vehicle body floor 36 by screwing two bolts 37 extending from bottom to top through the two, that is, left and right, first fixing portions 31f of the case main body 31 and the two, that is, left and right, bolt holes 32b of the cover 32 into two nuts 38 provided on an upper face of the second floor cross member 17 and screwing two bolts 39 extending from bottom to top through the two, that is, left and right, second fixing portions 31g of the case main body 31 and the two, that is, left and right, bolt holes 32c of the cover 32 into two nuts 40 provided on upper faces of the left and right floor frames 15.

The operation of the embodiment of the present invention having the above arrangement is now explained.

Since the battery case 20 formed from the case main body 31 and the cover 32 is made by metal die-casting, not only is it possible to decrease the number of components and the weight by forming the first and second fixing portions 31f and 31g integrally with the case main body 31, but it is also possible to enhance the side collision resistance performance by increasing the strength of the case main body 31 while minimizing any increase in the number of components and the weight by forming the cross member 31e integrally with the case main body 31.

That is, since the two, that is, front and rear, second fixing portions 31g and the linking wall 31h, which is formed into a planar shape opposing the case side wall 31d and links the two second fixing portions 31g in the fore-and-aft direction, are formed integrally with the case side wall 31d of the case main body 31 of the battery case 20 opposing the floor frame 15, when the vehicle is involved in a side collision and the collision load is inputted from the floor frame 15 into the case main body 31 of the battery case 20, the space surrounded by the two second fixing portions 31g, the linking wall 31h, and the case side wall 31d collapses, thus absorbing effectively the collision energy.

In this process, since the outer end in the vehicle width direction of the second fixing portion 31g is positioned further inside in the vehicle width direction than the outer end in the vehicle width direction of the floor frame 15, the collision load of the side collision is preferentially supported by the floor frame 15, and a collision load that could not be received is received by the battery case 20, thus minimizing damage to the battery case 20.

Furthermore, since the second fixing portion 31g and the linking wall 31h are formed integrally with the case main body 31 made by metal die-casting, not only is it possible to reduce the number of components, but also the stiffness of the case main body 31 can be enhanced by the second fixing portion 31g and the linking wall 31h. Moreover, since the case main body 31 includes, between the two second fixing portions 31g, the rib 31i linking the case side wall 31d and the linking wall 31h in the vehicle width direction, the side collision resistance performance can be further enhanced by reinforcing the second fixing portion 31g and the linking wall 31h with the rib 31i.

Furthermore, since the second fixing portion 31*g*, which projects outward in the vehicle width direction from the case side wall 31*d* of the case main body 31, is fixed to the floor frame 15 by means of the bolt 39 and the nut 40, the collision load of a side collision is transmitted from the floor frame 15 directly to the cross member 31*e* of the case main body 31 and supported, and even if the strength of the floor frame 15 is decreased and the weight is lightened, the side collision resistance performance can be ensured. Moreover, since the cover 32 of the battery case 20 has the recess portion 32*a* downwardly recessed toward the cross member 31*e* of the case main body 31, and the recess portion 32*a* and the second floor cross member 17 of the vehicle body overlap one another when viewed in the up-down direction, it is possible to dispose the battery case 20 at a high position while avoiding interference with the second floor cross member 17, thus ensuring ground clearance for the vehicle.

Moreover, the bulge portions 32*d* and 32*e* housing the electrical component 35 such as a battery control device, a junction board, or a cell voltage sensor are formed on the upper face of the cover 32 of the battery case 20; since the bulge portions 32*d* and 32*e* are disposed between the first floor cross member 16 and the second floor cross member 17 when viewed in the up-down direction, it is possible to mount the battery case 20 having the bulge portions 32*d* and 32*e* on the vehicle body while avoiding interference with the first and second floor cross members 16 and 17.

Furthermore, since the case rear wall 31*c* of the battery case 20 is positioned further forward than the front end part of the fuel tank 23, it is possible to ensure the comfort of a rear seat by preventing the battery case 20 from projecting rearward.

An embodiment of the present invention is explained above, but the present invention may be modified in a variety of ways as long as the modifications do not depart from the gist of the present invention.

For example, the number of second fixing portions 31*g* is not limited to two each for left and right as in the embodiment, and may be three each for left and right.

In the embodiment the case main body 31 and the cover 32 of the battery case 20 are both made by metal die-casting, but the cover 32 is not necessarily made by metal die-casting.

What is claimed is:

1. A battery case fixing structure via which a battery case housing a battery for driving an electric vehicle is fixed to a lower part of a vehicle body,
    wherein a case side wall, facing outward in a vehicle width direction, of the battery case comprises at least two fixing portions that project outward in the vehicle width direction and are fixed to the vehicle body, and a linking wall that is formed as a planar shape opposing the case side wall and links said at least two fixing portions in a fore-and-aft direction, the fixing portions and the linking wall being formed integrally with the battery case by metal die-casting, and
    wherein the linking wall extends between lateral outer ends of the fixing portions in the fore-and-aft direction while being distanced from the case side wall in the vehicle width direction.

2. The battery case fixing structure according to claim 1, wherein the battery case comprises, between the two fixing portions, a rib that links the case side wall and the linking wall in the vehicle width direction.

3. The battery case fixing structure according to claim 2, wherein the fixing portion is fixed to a floor frame extending in the fore-and-aft direction, and the lateral outer end in the vehicle width direction of the fixing portion is positioned further inside in the vehicle width direction than an outer end in the vehicle width direction of the floor frame.

4. The battery case fixing structure according to claim 2, wherein the rib does not extend below the linking wall.

5. The battery case fixing structure according to claim 2, wherein a plurality of the ribs are provided so as to be distanced from each other in the fore-and-aft direction.

6. The battery case fixing structure according to claim 5, wherein the ribs do not extend below the linking wall.

7. The battery case fixing structure according to claim 1, wherein the fixing portion is fixed to a floor frame extending in the fore-and-aft direction, and the lateral outer end in the vehicle width direction of the fixing portion is positioned further inside in the vehicle width direction than an outer end in the vehicle width direction of the floor frame.

\* \* \* \* \*